United States Patent
Xing et al.

(10) Patent No.: US 11,388,602 B2
(45) Date of Patent: Jul. 12, 2022

(54) NETWORK SLICING WITH A RADIO ACCESS NETWORK NODE

(71) Applicant: T-Mobile USA, Inc., Bellevue, WA (US)

(72) Inventors: Shuqing Xing, Bellevue, WA (US); Jun Liu, Issaquah, WA (US); Brian Allan Olsen, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 105 days.

(21) Appl. No.: 16/850,545

(22) Filed: Apr. 16, 2020

(65) Prior Publication Data

US 2021/0329464 A1    Oct. 21, 2021

(51) Int. Cl.
*H04W 16/02* (2009.01)
*H04W 76/12* (2018.01)
*H04W 72/08* (2009.01)

(52) U.S. Cl.
CPC ......... *H04W 16/02* (2013.01); *H04W 72/087* (2013.01); *H04W 76/12* (2018.02)

(58) Field of Classification Search
CPC combination set(s) only.
See application file for complete search history.

(56) References Cited

U.S. PATENT DOCUMENTS

| | | | | |
|---|---|---|---|---|
| 2017/0303259 A1* | 10/2017 | Lee | ........................ | H04W 28/16 |
| 2019/0029065 A1* | 1/2019 | Park | ........................ | H04W 12/06 |
| 2019/0053148 A1* | 2/2019 | Lee | ........................ | H04W 48/18 |
| 2019/0230556 A1* | 7/2019 | Lee | ........................ | H04W 28/16 |
| 2019/0261157 A1* | 8/2019 | Ramle | .................... | H04W 48/18 |
| 2019/0357129 A1* | 11/2019 | Park | ........................ | H04W 88/14 |
| 2020/0120589 A1* | 4/2020 | Velev | ...................... | H04W 76/25 |

(Continued)

FOREIGN PATENT DOCUMENTS

WO    WO2020177523 A1    9/2020

OTHER PUBLICATIONS

3GPP, "Technical Specification Group Services and System Aspects; Security Aspects; Study on Security Aspects of Enhanced Network Slicing (Release16)", vol. SA WG3, No. V0.8.0, Jan. 2, 2020, pp. 1-38.

(Continued)

*Primary Examiner* — Ajay Cattungal
(74) *Attorney, Agent, or Firm* — Lee & Hayes, P.C.

(57) ABSTRACT

Systems, methods, and apparatuses may comprise a Radio Access Network (RAN) node for performing RAN-layer network slicing. The system may comprise a User Equipment (UE) in communication with the RAN node to provide the UE access to a core network (e.g., a 3rd Generation Partnership Project (3GPP) 5G network). The core network may comprise one or more Network Functions (NF) including an Access and Mobility Management Function (AMF) for facilitating communications between the RAN node and other NFs. By sending one or more RAN node messages and/or AMF messages, the system may perform RAN-layer slicing to register the UE with a network slice, establish a PDU session for the UE with the network slice, and/or provide a service to the UE with the network slice. In some instances, RAN-layer network slicing may be performed for multiple, specific use cases to meet UE service requirements.

17 Claims, 8 Drawing Sheets

(56) References Cited

U.S. PATENT DOCUMENTS

| | | | | |
|---|---|---|---|---|
| 2020/0236528 A1* | 7/2020 | Lee | .................... | H04W 8/082 |
| 2020/0267554 A1* | 8/2020 | Faccin | ................ | H04W 12/082 |
| 2020/0322857 A1* | 10/2020 | Park | .................... | H04W 76/34 |
| 2020/0359224 A1* | 11/2020 | Gibson | ................ | H04W 16/02 |
| 2020/0396648 A1* | 12/2020 | Watfa | ................ | H04W 36/0027 |
| 2020/0413241 A1* | 12/2020 | Park | .................... | H04W 76/22 |
| 2021/0297844 A1* | 9/2021 | Prabhakar | ................ | H04W 8/12 |

OTHER PUBLICATIONS

Extended European Search Report dated Oct. 22, 2021 for European Patent Application No. 21168001.2, 23 pages.
Ericcson, "NSSF and Slice Selection during the Registration procedures", 3GPP Draft; S2-175216, vol. SA WG2, Jul. 3, 2017, 12 pages.
Ericsson, "NSSF and Slice selection during the Registration procedures", 3GPP Draft; S2-174992, vol. SA WG2, Jul. 3, 2017, 12 pages.
Huawei, "Clarification on Allowed NSSAI", 3GPP Draft, R3-173898, vol. RAN WG3, Oct. 9, 2017, 5 pages.
ZTE Corporation, "Evaluation of Solution #12", 3GPP Draft; S3-193518-Evaluation of Solution #12, vol. SA WG3, Oct. 7, 2019, 3 pages.

* cited by examiner

NETWORK SLICING WITH A RADIO ACCESS NETWORK NODE

BACKGROUND

Providing new and updated wireless services over $3^{rd}$ Generation Partnership Project (3GPP) networks with reliable low-latency rates and high data rates is an ongoing challenge for service providers as network infrastructure is updated, end-user devices evolve, and services are added. Meanwhile, consumers expect instant access to services from multiple different types of devices. Consumers expect high-quality user experiences whether they are at home or travelling. For instance, consumers often rely on 3GPP networks for seamless, instantaneous services (music and video streaming, GPS location tracking, mapping, etc.) as they travel through different regional areas having different network coverages. As such, 3GPP networks are built upon multiple media layer protocols and network nodes that must be regularly updated to meet changing consumer demands. Service providers may seek new ways to improve the performance of their networks

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Systems, methods, and apparatuses (hereinafter the "system") disclosed herein may comprise a Radio Access Network (RAN) node for performing RAN-layer network slicing. The system may comprise a User Equipment (UE) in communication with the RAN node, which may provide the UE access to a core network (e.g., a $3^{rd}$ Generation Partnership Project (3GPP) 5G network). RAN-layer network slicing may be performed for multiple, specific use cases for meeting service-based requirement. In some instances, RAN-layer slicing may comprise a portion of end-to-end slicing, which may also include core-layer slicing and transport-layer slicing. RAN-layer slicing may improve network performance by slicing radio resource allocations, providing slice isolation at the RAN-layer, providing Network Slice Selection Assistance Information (NSSAI)-specific access control, and/or providing mobility management functions.

In some examples, a RAN-layer networking slicing method may include dividing a single physical infrastructure into multiple virtual layers or networks, using network functions virtualization (NFV), software-defined networking (SDN), and/or allowing an operator to provide customized networks with different requirements In some examples, as a result of RAN-layer network slicing, the system may provide a higher spectrum utilization ratio with a high network capacity, which may minimize capital expenses, improve network performance, and/or improve a user experience (high date rate, low latency).

In some examples, the system may improve the functioning of communications associated with a core network by strategically allocating one or more resources (e.g., radio resources and/or network functions) based on a type of device and/or a service requirement associated with the device. For instance, a first example device may comprise an Internet-of-Things (IoT) device with one or more IoT sensors. The IoT device may be registered to a first particular network slice (e.g., based on a first allowed s-NSSAI value stored at a RAN node) that provides a first particular allocation of resources. The first particular network slice may be determined based on a type of device (e.g., IoT device) and/or the service requirement(s) associated with the IoT device (e.g., low bandwidth, low frequency, and/or high latency). As such, the first particular allocation of resources provided to the IoT device by the first particular network slice may include a low frequency (e.g., 600 MHz) channel that provides adequate ground or building penetration to satisfy one or more service requirements of the IoT device. For example, a bandwidth of the first particular network slice may be limited to meet the service requirements of the IoT device without excessive bandwidth allocation.

In some instances, a second example device may comprise an Autonomous Vehicle (AV) device with one or more AV sensors (e.g., a Light Detection and Ranging (LIDAR) system). The AV device may be registered to a second particular network slice (e.g., based on a second allowed s-NSSAI value stored at the RAN node) that provides a second particular allocation of resources. The second particular network slice may be determined based on the type of device (e.g., AV device) and/or the service requirement(s) associated with the AV device (e.g., high bandwidth, high frequency, and/or low latency). As such, the second particular allocation of resources provided to the AV device by the second particular network slice may include a high bandwidth, high frequency channel that meets a Ultra-Reliable Low Latency Communication (URLLC) standard. Accordingly, multiple different network slices may allocate different allocations of resources to different types of devices, which may be based on different service requirements associated with the different devices.

Figure 1:
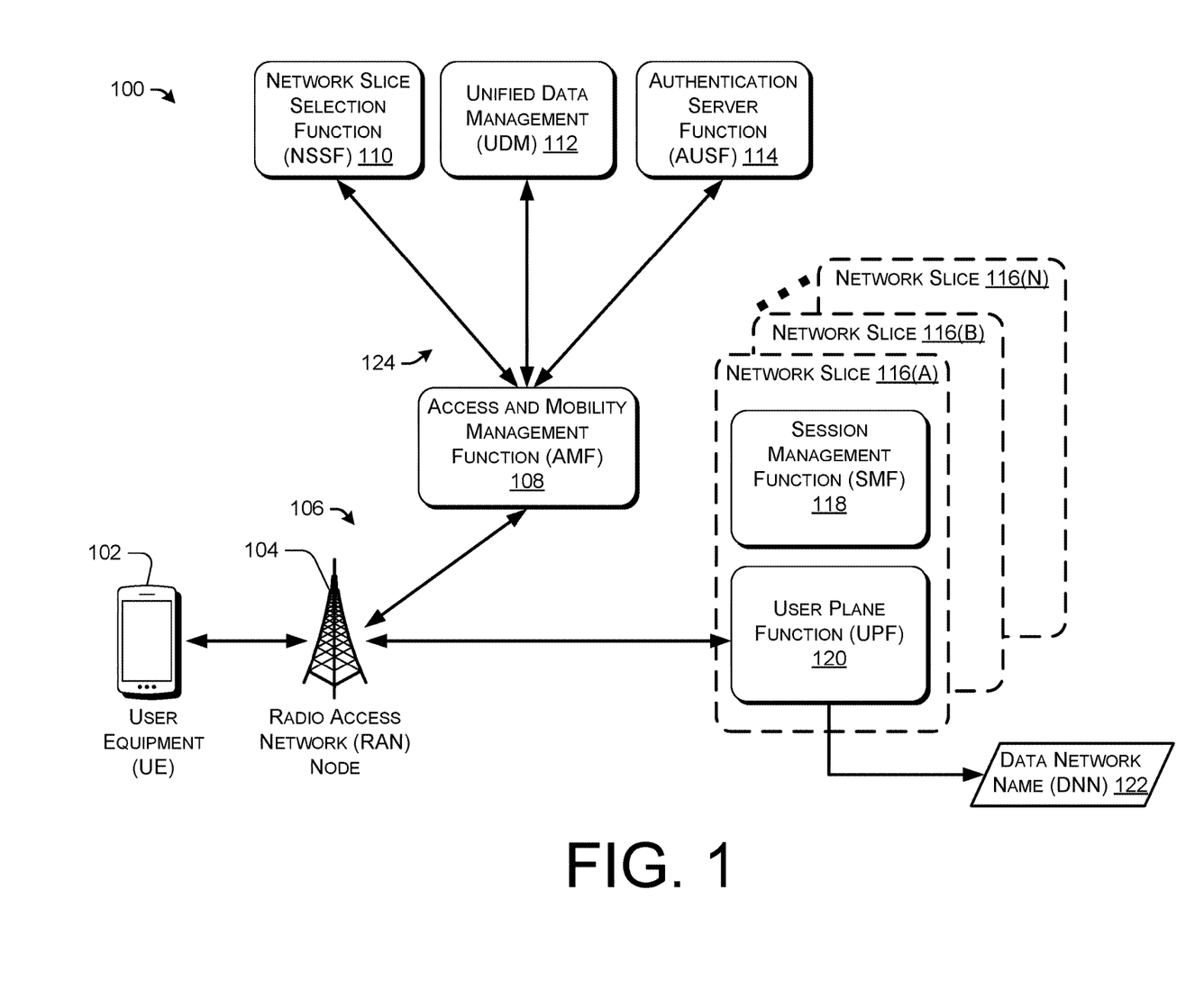
FIG. 1 depicts a schematic diagram of an example system for registering a User Equipment (UE) with a network slice via a Radio Access Network (RAN) node.

FIG. 1 depicts an example system 100 for performing slice registration based on communications at a RAN-layer. The system 100 may include a UE 102 in wireless communication with a RAN node 104 that provides access to a core network (e.g., a 3$^{rd}$ Generation Partnership Project (3GPP) network 5G). For instance, the RAN node 104 may communicate with the core network via one or more RAN node messages 106 sent to and from an Access and Mobility Management Function (AMF) 108 or other Network Functions (NF)s of the core network. The core network may include one or more NFs, such as a Network Slice Selection Function (NSSF) node 110, a Unified Data Management (UDM) 112 node, and an Authentication Server Function (AUSF) 114. In some instances, the core network of the system 100 may include NFs, such as a Network Repository Function (NRF) 202, a Policy Control Function (PCF) 204, or an Authentication, Authorization, and Accounting (AAA) server 206, as discussed below regarding FIG. 2.

In some examples, the system 100 may comprise one or more network slices 116 (e.g., a first network slice 116(A), a second network slice 116(B) . . . 116(N)) that may be registered with the UE 102. The first network slice 116(A) may comprise a particular Session Management Function (SMF) 118. In some instances, references to a "particular" function may correspond to a physical or logical portion of one or more function resources. The first network slice 116(A) may comprise a particular User Plane Function (UPF) 120 that communicates with the particular SMF 118. The first network slice 116(A) may comprise other particular NFs allocated to the first network slice 116(A), for instance, as part of registering the first network slice 116(A) with the UE 102. For instance, the first network slice 116(A) may be designated and/or identified by a data network name (DNN) 122 which may be provided or accessed by the UPF 120, which may communicate with the DNN. The second network slice 116(B) may comprise a different set of one or more NFs, such as a second particular UPF. The second network slice 116(B) may omit an SMF. The second network slice 116(B) may communicate with the first network slice 116(A), as discussed in greater detail below regarding FIG. 3. In some instances, the first network slice 116(A), the second network slice 116(B), or any number of network slices 116(N) may include one or more NFs including the UE 102, the AMF 108, the NSSF 110, the SMF 118, the UPF 120, the DNN 122 the NRF 202, and/or the PCF 202.

In some examples, the system 100 may comprise the UE 102, which may comprise a computing device that communicates with other components of the system 100, for instance, over a wired or wireless network. The UE 102 may comprise a mobile phone (e.g., a smart phone), a tablet computer, a laptop computer, a portable digital assistant (PDA), a wearable computer (e.g., electronic/smart glasses, a smart watch, fitness trackers, etc.), an internet-of-things (IoT) device, an in-vehicle (e.g., in-car) computer, and/or any similar mobile device, as well as situated computing devices including, without limitation, a television (smart television), set-top-box (STB), desktop computer, and the like. The UE 102 may send one or more messages (e.g., the RAN node 104) via a Radio Resource Control (RRC) channel and one or more RRC messages sent via the RRC channel In some examples, the system 100 may comprise the RAN node 104, which may comprise a 3GPP RAN base station, such as a GSM/EDGE RAN (GERAN), a Universal Terrestrial RAN (UTRAN), or an evolved UTRAN (E-UTRAN), or alternatively, via a "non-3GPP" RAN, such as a Wi-Fi RAN, or another type of wireless local area network (WLAN) that is based on the IEEE 802.11 standards, or any other network node for connecting the UE 102 to an access network. For instance, the RAN node 104 may comprise a base station that connects the UE 102 to the core network through a wireless access technology, such as a Node B (NB), an eNode B (eNB), a gNB, a Wi-Fi access point, or any other type of base station or access point. For instance, the RAN node 104 may comprise the gNB and, as such, the system 100 may store the allowed s-NSSAI value associated with the UE 102 and/or the network slice 116 at the gNB.

In some examples, the RAN node 104 may comprise one or more computer-readable storage media (e.g., memory storage devices), such as non-transitory computer-readable media that may include phase change memory (PCM), static random-access memory (SRAM), dynamic random-access memory (DRAM), other types of random access memory (RAM), read only memory (ROM), electrically erasable programmable ROM (EEPROM), flash memory or other memory technology, compact disc ROM (CD-ROM), digital versatile discs (DVD) or other optical storage, magnetic cassettes, magnetic tape, magnetic disk storage or other magnetic storage devices, combinations thereof, or any other medium that can be used to store information for access by an electronic computing device. Databases discussed herein, for instance stored at computer-readable storage media, may include one or more of a comma delimited list, a spreadsheet, an array, a NoSQL data structure, a hash-based data structure, an object-based data structure, or any other data type, data structure, and/or data system for storing retrievable data.

In some examples, the RAN node 104, may comprise one or more processor(s), such as a microprocessor, a microcomputer, a microcontroller, a digital signal processor, a central processing unit (CPU), a graphics processing unit (GPU), combinations thereof, etc. Among other capabilities, the one or more processor(s) may operate to fetch and execute computer-readable instructions stored in the one or more computer-readable media, for instance, to perform the operations disclosed herein.

Figure 2:
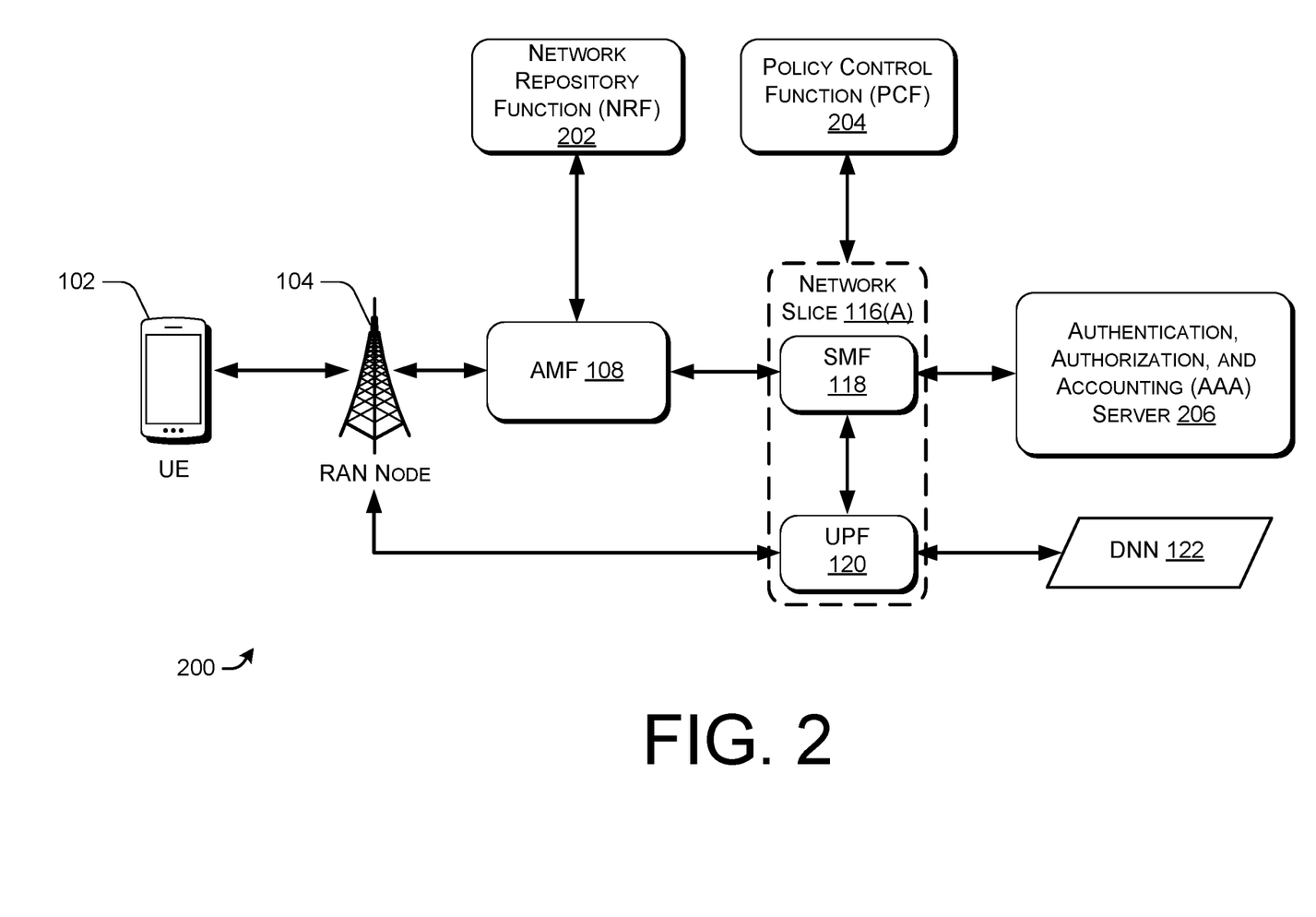
FIG. 2 depicts a schematic diagram of an example system for establishing a Protocol Data Unit (PDU) session for the UE with the network slice via the RAN node, which may form at least a portion of the system illustrated in FIG. 1.

In some examples, the core network and/or individual components of the core network, such as NFs or nodes of the core network 106 (e.g., the AMF 108, the NSSF 110, the UDM 112, the AUSF 114, the one or more network slices 116(N), the particular SMF 118, the particular UPF 120, the NRF, 202, the PCF 204, and/or the AAA server 206) may also comprise one or more computer-readable media and/or one or more processors to execute instructions stored on the one or more computer-readable media, similar or identical to those discussed above.

In some examples, the RAN node 104 may store data indicating or associated with at least: (1) one or more services and/or applications that communicate with the UE 102; (2) the DNN 122 indicating the first network slice 116(A) or any number of network slices 116(N); (3) information based on a Service Level Agreement (SLA); and/or (4) information from an Application Server (AS), the core network, the UE 102, and/or a transport node.

In some examples, the RAN node 104 may perform one or more operations that may be based on information received and/or stored at the RAN node 104 (e.g., the s-NSSAI value associated with the UE 102 and/or the network slice 116). For instance, the RAN node 104 may: provide service-based network slicing, handle traffic differential for pre-configured network slices 116; perform admission control with service-based network slicing; perform mobility management with service-based network slicing; provide resource management and utilize a radio resource to slice the network slice 116 with defined services; perform load control and load balance for end-to-end network slicing; and/or perform flow control and layer management for different network architectures.

Moreover, the RAN node 104 may access the s-NSSAI value and/or an association of the s-NSSAI value to the UE 102 and/or the network slice 116 to perform one or more operations, such as: supporting Quality of Service (QoS) flow and mapping to services/applications; supporting the UE 102 in different RRC states (e.g., RRC-Idle, RRC-Connection, and/or RRC-Inactive) to meet low latency service requirement (e.g., stay below a latency threshold value) and/or stay below a battery usage threshold value; RAN slice security which may include isolating the one or more network slices 116, for instance, to rent/release the network slice 116 to a private network; NSSAI-based AMF selection and rerouting; and/or supporting network slice management.

In some examples, the RAN node 104 may at least partly determine the one or more network slices 116 and/or one or more components or characteristics of the one or more network slices 116 to which the UE is registered based on one or more of: a network functionality (e.g., priority, charging, policy control, security, and/or mobility), performance requirements (e.g., latency, availability, reliability, and/or a data rate), a specific user associated with the UE 102 (e.g., a Multimedia Priority Service association, a public safety account, a corporate account, or roamers/hosts in Mobile Virtual Network Operator (MVNO).

In some examples, the core network may comprise one or more NFs to provide services over the 3GPP network (e.g., the 5G network, a 3G network, a 4G network, a 4G Long Term Evolution (LTE) network, an LTE Advanced network, an evolved IP Multimedia System (IMS) network, combinations thereof, etc.). The core network may comprise one or more of the NSSF 110, the UDM 112, the AUSF 114, the one or more network slices 116(N), one or more SMFs 118, one or more UPFs 120, the NRF 202, the PCF 204, and/or the AAA server 206.

In some examples, the system may comprise the core network. The core network may receive and/or aggregate data traffic from one or more UEs 102. The core network may authenticate devices and their users, may apply policies to operations of the UE 102, and may manage the mobility of the UE 102 (e.g., handovers), and/or routing traffic of the UE 102 to operator services or the Internet. In some instances, the core network may communicate with the RAN node 104 via the AMF 108 and/or one or more other gateway nodes.

In some examples, the system 100 may comprise the AMF 108 which may be implemented as a NF including functionality to provide UE-based authentication, authorization, mobility management, etc., to various UEs 102. In some instances, the AMF 108 may include functionality to initiate or terminate a RAN control plane interface between the UE 102 and other functions on the network. In some instances, the AMF 108 may include functionality to perform registration management of the UE 102 in a network, connection management, reachability management, mobility management, access authentication, access authorization, security anchor functionality (e.g., receiving and/or transmitting security keys during registration/authorization), and the like.

In some examples, the UDM 112 may comprise a NF including functionality to process authentication credentials, handle user identification processing, manage registration and/or mobility, manage subscriptions between the UE 102 and a carrier, and or manage SMS (short message service) data.

In some examples, the AUSF 114 may comprise a NF including functionality to provide authentication to various UEs 102 in the network. For example, the AUSF 114 may request device credentials (e.g., security key(s)), verify that a device is authorized to connect to a network, and/or control access to the network based on the device credentials.

In some examples, the one or more network slices 116 may include a single physical infrastructure divided into multiple virtual networks, using NFs virtualization (NFV) and/or software-defined networking (SDN), and may represent particular requirements customized for a particular network service (e.g., by a network operator). The one or more network slices 116 may include one or more UPF configurations, SMF configurations, spectrum allocations, and/or other network resources that may be detected or utilized by the RAN node 104.

In some instances, the one or more network slices 116 may include combinations of NFs including the SMF 118 and the UPF 120, as well as other NFs. For instance, the one or more network slices 116 may comprise at least one or more of the AMF 108, the NSSF 110, the DNN 122, a Network Repository Function (NRF) (e.g., NRF 202 discussed below regarding FIG. 2), and/or a Policy Control Function (PCF) (e.g., the PCF 204 discussed below regarding FIG. 2). In some examples, the NFs comprising a particular network slice 116 may be based on a service-level requirement of the UE 102, and the multiple NFs may comprise one physical infrastructure (e.g., dynamically and virtually).

In some examples, the first network slice 116(A) may comprise the particular SMF 118. The particular SMF 118 may manage communication sessions by and between UEs, and/or to provide internet protocol (IP) addresses to the UEs 102.

In some examples, first network slice 116(A) may comprise the particular UPF 120. The particular UPF 120 may be implemented as a NF including functionality to control data transfer between the UE 102 and the various components of the core network. In some instances, the particular UPF 120 may include functionality to act as an anchor point for Radio Access Technology (RAT) handover (e.g., inter and intra), external PDU session point of interconnect to a data network (e.g., the internet), to perform packet routing and forwarding, packet inspection and user plane portion of policy rule enforcement, traffic usage reporting, traffic routing, QoS handling for user plane (e.g., packet filtering, gating, uplink/downlink rate enforcement), uplink traffic verification, transport level packet marking in the uplink and downlink, downlink packet buffering and downlink data notification triggering, and the like. As can be understood in the context of this disclosure, there may be a plurality of UPFs 120 associated with a plurality of network slices 116 and/or with the UE 102.

Figure 3:
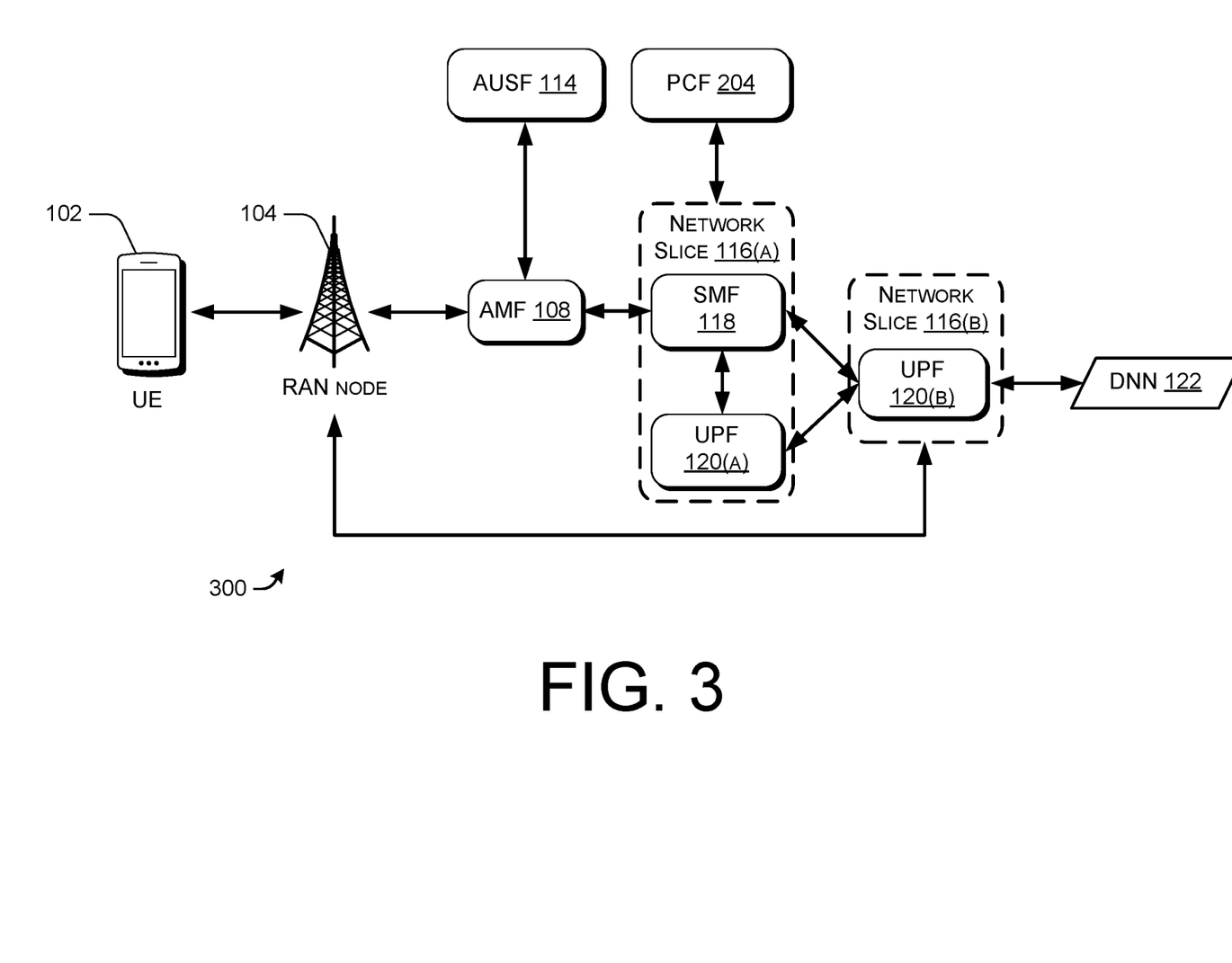
FIG. 3 depicts a schematic diagram of an example system for providing a service to the UE with one or more network slices via the RAN node, which may form at least a portion of the system illustrated in FIG. 1.
Figure 4:
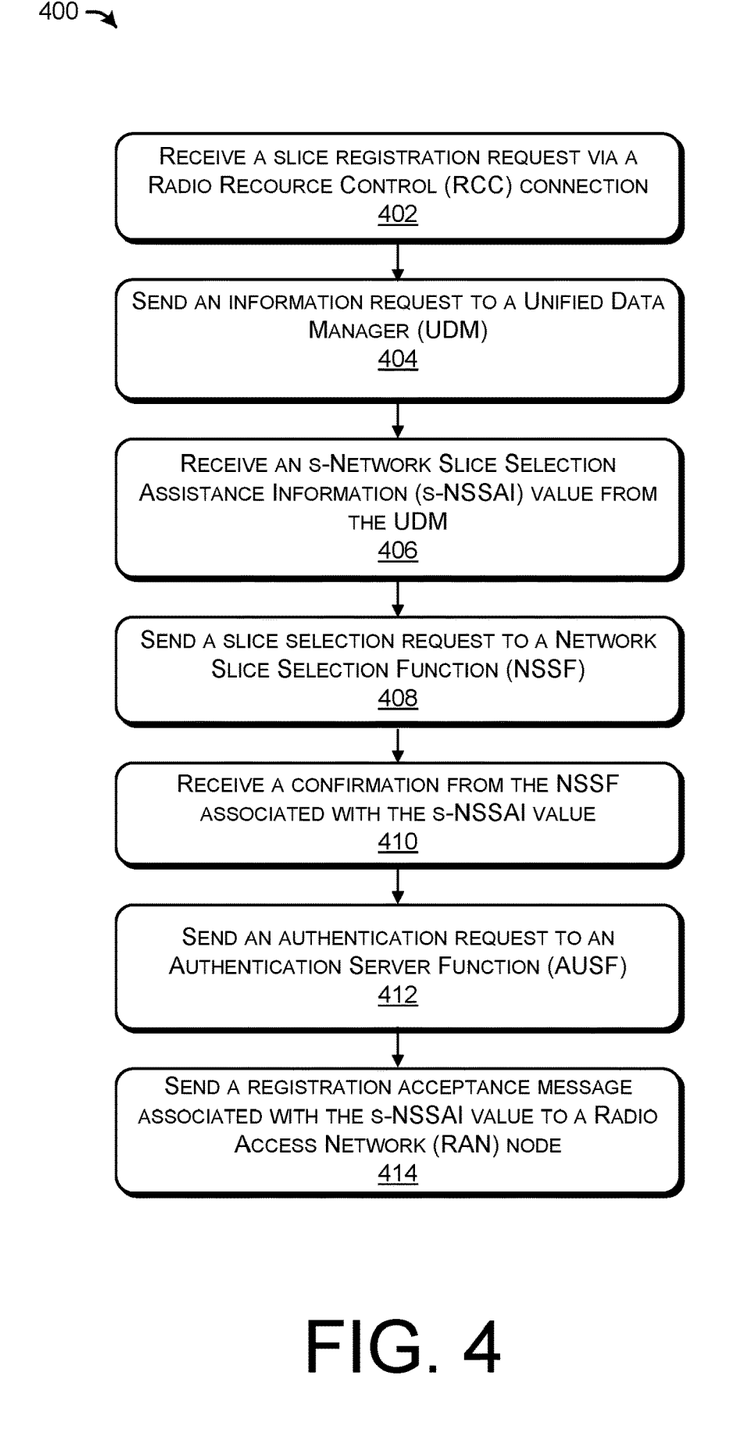
FIG. 4 depicts a flow chart of an example method for registering the UE with the one or more network slices, which may be performed by at least by the system illustrated in FIG. 1.
Figure 5:
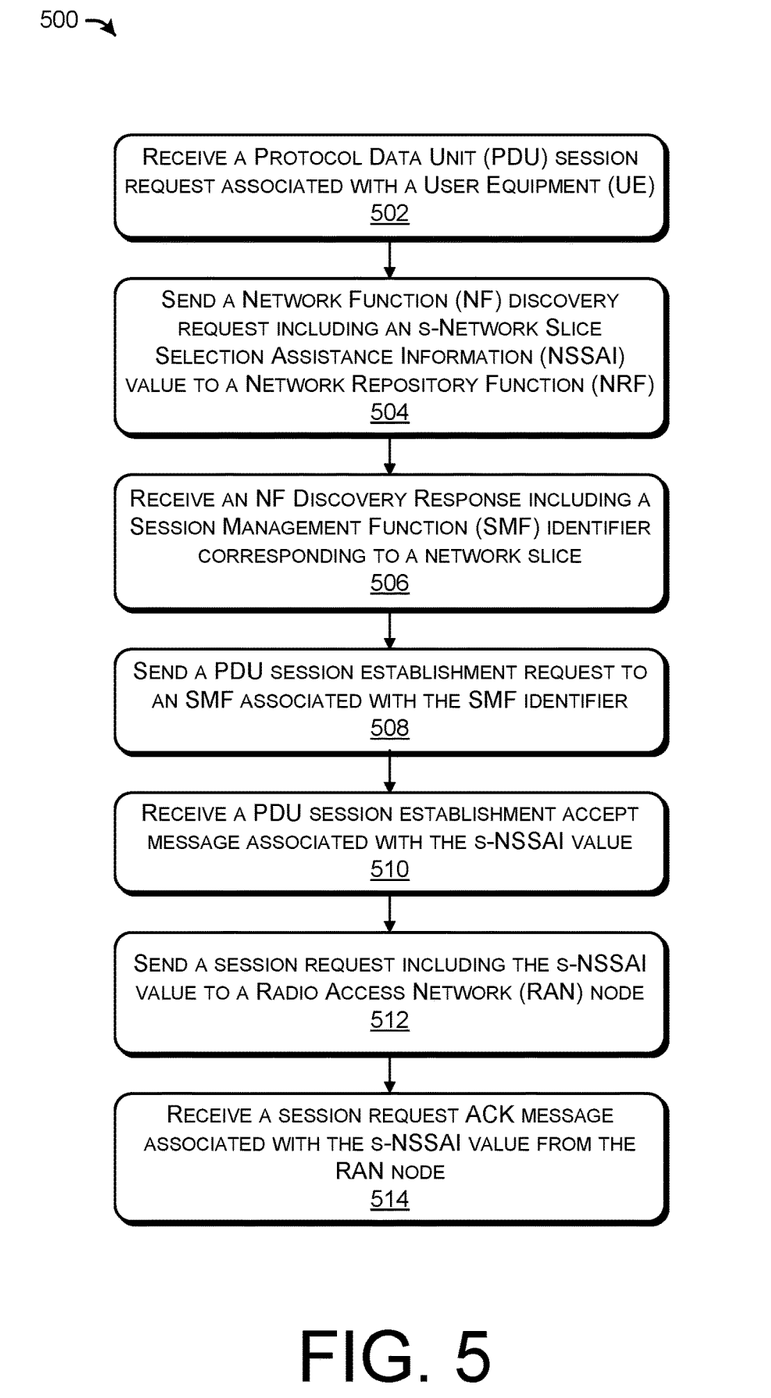
FIG. 5 depicts a flow chart of an example method for establishing a PDU session with the network slice via the RAN node and one or more Access and Mobility Management Function (AMF) messages, which may be performed at least by the system illustrated in FIG. 2.
Figure 6:
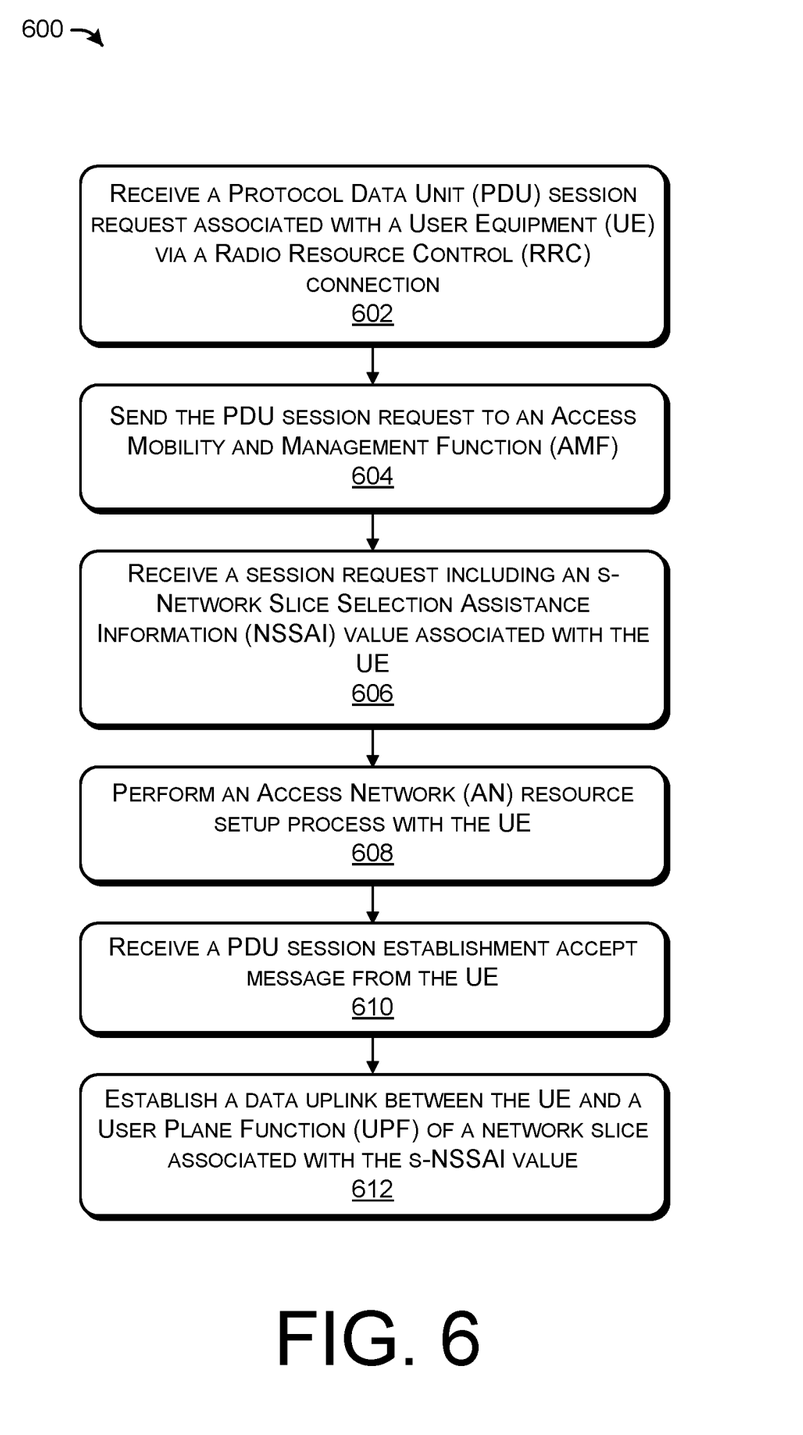
FIG. 6 depicts a flow chart of an example method for establishing the PDU session with the network slice via one or more RAN node messages, which may be performed at least by the system illustrated in FIG. 2.
Figure 7:
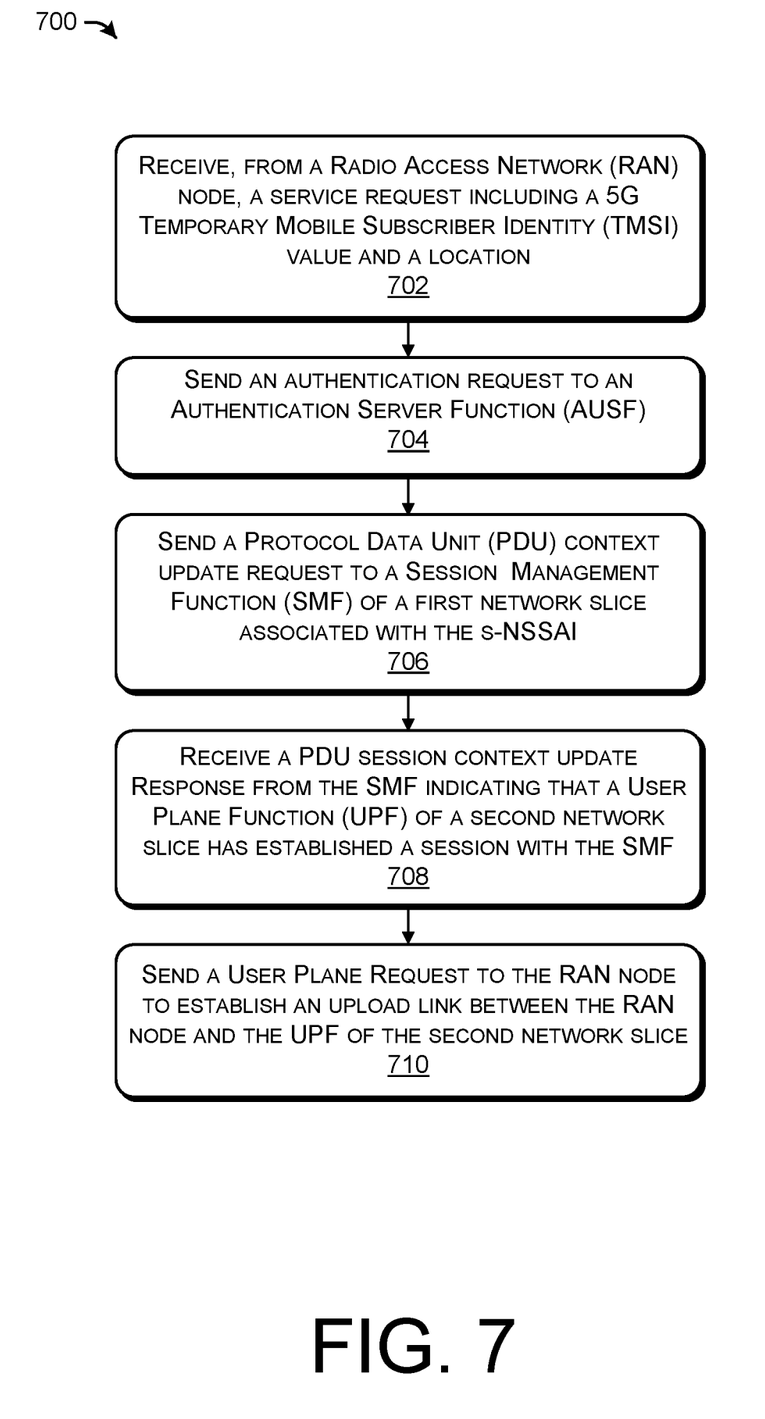
FIG. 7 depicts a flow chart of an example method for providing a service to the UE with the one or more network slices via the one or more AMF messages and the RAN node, which may be performed at least by the system illustrated in FIG. 3.
Figure 8:
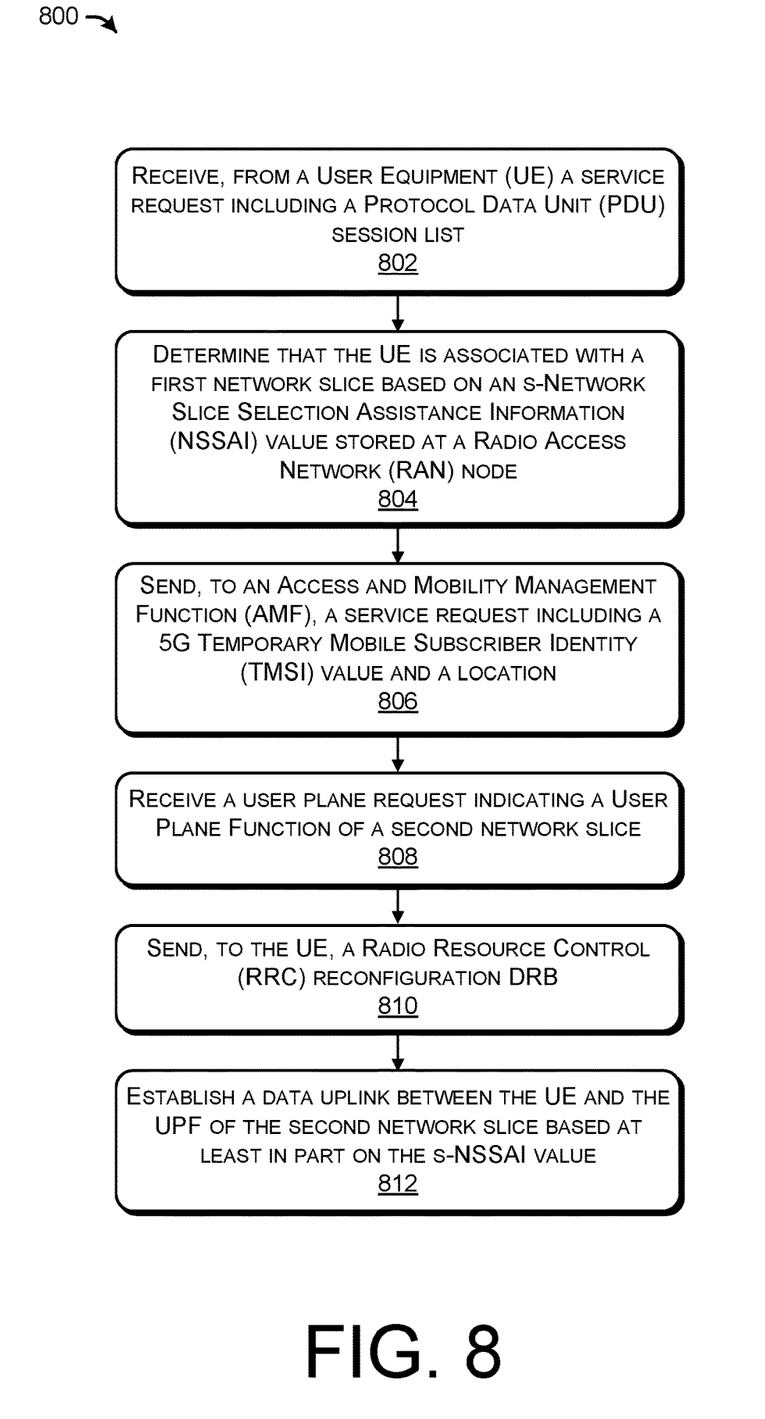
FIG. 8 depicts a flow chart of an example method for providing the service to the UE with the one or more network slices via the one or more RAN node messages, which may be performed at least by the system illustrated in FIG. 3.

As discussed in greater detail below, FIG. 4 illustrates further example methods and techniques for registering the UE 102 with the one or more network slices 116(N). FIGS. 2, 5, and 6 illustrate further example systems, methods, and techniques for establishing a PDU session for the UE 102 via the network slice registered by the RAN node 104. FIGS. 3, 7, and 8 illustrate further example systems, methods, and techniques for providing a service to the UE 102 via the network slice 116 registered by the RAN node 104.

FIG. 2 depicts an example system 200 for establishing a PDU session with the one or more network slices 116. The system 200 may be similar to, identical to, or may form a portion of any of the systems discussed herein. The system 200 may perform one or more methods or techniques to establish the PDU session via the one or more network slices 116, as discussed in greater detail below regarding FIGS. 5 and 6.

The system 200 may include the core network and any of the components of the core network discussed above. Specifically, for establishing the PDU session with the first network slice 116(A), the core network may comprise the NRF 202, the PCF 204, and/or the AAA server 206.

In some examples, the system 200 may comprise the NRF 202, which may perform one or more functions such as managing a database of the various utilizations levels of various UPFs. The NRF 202 may select and/or provide, at least in part, the particular UPF 120 to the UE 102, so that the particular UPF 120 may carry user traffic associated with the UE 102. For instance, the NRF 202 may select and/or provide the particular UPF 120 based at least partly on a current, historical, or expected utilization of one or more UPFs, and/or based on services requested and various locations of the services in the core network.

In some examples, the NRF 202 may be implemented as a NF including functionality to support service discovery (e.g., receive a NF discovery request and provide information associated with discovered NF instances to a requesting entity). In some instances, the NRF 202 may receive utilization information, capability information, etc. from various NFs, such as the particular UPF 120, to provide such utilization information to the other components discussed herein. Further, the NRF 202 may select, assign, implement, or otherwise determine NFs to form a portion of the one or more network slices 116(N) based at least in part on utilization information.

In some examples, the system 200 may comprise the PCF 204. The PCF 204 may be implemented as an NF including functionality to support a unified policy framework, which may govern network behavior, provide policy rules to control plane functions, enforce such rules, and/or implement a front end to access subscription information relevant for policy decisions in a data repository.

In some examples, the system 200 may comprise the AAA server 206. The AAA server 206 may perform various authentication, authorization or accounting functions. For instance, the AAA server 206 may perform similar functions as the AMF 108, but the functions of the AAA server may be specifically customized for particular network slices (e.g., the first network slice 116(A), the second network slice 116(B), etc.) of the one or more network slices 116

In some examples, the system 200 may establish the PDU session with the one or more AMF messages 124 generated and sent by the AMF 108, and/or messages received at the AMF 108 from the NFs (e.g., as illustrated in FIG. 5). The system 200 may establish the PDU session with the one or more RAN node messages 106 generated and sent by the RAN node and/or messages received at the RAN node 104 from the network UE 102, the AMF 108, the one or more network slices 116(N) and/or other NFs (e.g., as illustrated in FIG. 6).

FIG. 3 depicts an example system 300 for providing a service with the one or more network slices 116. The system 300 may be similar to, identical to, or may form a portion of any of the systems discussed herein. The system 300 may perform one or more methods or techniques to provide a service to the UE 102 via the one or more network slices 116 as discussed in greater detail below regarding FIGS. 7 and 8.

In some examples, the system 300 may include the first network slice 116(A), the second network slice 116(B), or any number of network slices 116(N). The first network slice 116(A) may comprise one or more of the particular SMF 118, a first UPF 120(A), a first AMF (e.g., similar or identical to AMF 108), a first NSSF (e.g., similar or identical to the NSSF 110), a first DNN (e.g., similar or identical to the DNN 122), a first NRF (e.g., similar or identical to NRF 202), and/or a first PCF (e.g., similar or identical to PCF 204). The second network slice 116(B) may comprise one or more of a second UPF 120(B), a second AMF (e.g., similar or identical to the AMF 108), a second NSSF (e.g., similar or identical to the NSSF 110), a second DNN (e.g., similar or identical to the DNN 122), a second NRF (e.g., similar or identical to NRF 202), and/or a second PCF (e.g., similar or identical to PCF 204).

The particular SMF 118 may communicate with the first UPF 120(A) to perform operations within the first network slice 116(A) (e.g., to establish a PDU session between the UE 102 and the first UPF 120(A)), and/or the particular SMF 118 may communicate with the second UPF 120(B) to access one or more services provided by the second network slice 116(B). The particular SMF 118 may communicate with any number of UPFs 120 of any number of network slices 116(N) to determine what services are provided by the one or more network slices 116 and/or to establish communication between the one or more network slices 116 to provide different services to the UE 102. Any number of network slices 116(N) may include one or more combinations of NFs including one or more of the UE 102, the AMF 108, the NSSF 110, the SMF 118, the UPF 120, the DNN, the NRF 202, and/or the PCF 204.

In some examples, the system 300 may include the core network which may comprise the PCF 204. The first network slice 116(A) may send/receive one or more messages to/from the PCF 204, for instance, during a session management policy modification procedure (e.g., in response to receiving, at the particular SMF 118, a PDU session update context request). The core network may comprise the AUSF 114, which may communicate with the AMF 108 to authenticate one or more service requests received at the AMF 108. Methods performed by the system 300 to provide a service to the UE 102 are discussed in greater detail below regarding FIGS. 7 and 8.

FIG. 4 depicts an example method 400 that may be performed by any of the systems discussed herein, although system 100 is discussed by way of example merely for convenience. The method 400 may include techniques performed by the system 100 for registering the UE 102 with the one or more network slices 116. In some instances, the steps of method 400 may be performed with one or more AMF messages 124 generated or sent from the AMF 108 and/or by the one or more RAN node messages 106 generated or sent from the RAN node 104.

At step 402, the system 100 may receive a slice registration request via the RRC connection. For instance, the UE 102 may generate and/or send the slice registration request to the RAN node 104. The slice registration request may include a request for an s-NSSAI value and may include information related to the UE 102, such as a UE identifier, mobility registration update information, a device status (e.g., an RRC status) data associated with a Public Land Mobile Network (PLMN) value, data associated with the DNN 122, an indicating of device specifications or compatibility information, and/or indications of one or more services associated with the UE 102.

At step 404, the system 100 may send an information request to the UDM 112. For instance, the AMF 108 may generate and/or send a message including the information request (e.g., the one or more AMF message 124) to the UDM 112. The information request may comprise a request for slice information and may include information received at the RAN node 104 from the UE 102.

At step 406, the system 100 may receive the s-NSSAI value from the UDM 112. The UDM 112 may determine, generate, and/or send the s-NSSAI to the AMF 108 in response to receiving the information request. The UDM 112 may determine that the s-NSSAI value corresponds to a particular network slice (e.g., the first network slice 116(A)) that matches requirements or compatibility information of the UE 102 (e.g., based on information stored and/or generated at the RAN node 104).

At step 408, the system 100 may send a slice selection request to the NSSF 110. For instance, the AMF 108 may generate and/or send the slice selection request at least partly in response to receiving the s-NSSAI value from the UDM 112. The slice selection request may include the s-NSSAI value received from the UDM 112.

At step 410, the system 100 may receive a confirmation from the NSSF 110 associated with the s-NSSAI value. For instance, the AMF 108 may receive the confirmation. For instance, the system 100 may determine and/or receive an indication that a requested s-NSSAI (e.g., which may be requested at step 402) corresponds to an acceptable network slice (e.g., matches one or more requirements of the UE 102) and, as such, the NSSF 110 may send an allowed s-NSSAI value that may be a same value as the requested s-NSSAI value. Additionally, or alternatively, the system 100 may determine and/or receive an indication that the requested s-NSSAI corresponds to a network slice that is not acceptable (e.g., does not match one or more requirements of the UE 102) and, as such, the NSSF 110 may send the allowed s-NSSAI value that may be a different value than the requested s-NSSAI value. The NSSF 110 may, upon receiving the slice selection request, determine that the one or more slices 116 are available to be associated with s-NSSAI value. The NSSF 110 may receive information indicating components and/or specifications of the one or more network slices 116 to determine if they are available and compatible for meeting requirements of the UE 102. In some examples, in response, the NSSF may send the confirmation to the AMF 108 indicating that the s-NSSAI value is an allowed s-NSSAI value and that, based on the s-NSSAI value, the UE 102 has been registered to the one or more network slices 116.

At step 412, the system 100 may send an authentication request to the AUSF 114. For instance, the system 100 may perform an authentication process with the AUSF 114 that may include one more messages/response between the AMF 108 and the AUSF 114. The AMF 108 may generate and/or send the authentication request which may include the allowed s-NSSAI value. One or more of the messages and responses between the AMF 108 and the AUSF 114 may include an authentication confirmation, which may be generated and/or sent by the AUSF 114 to the AMF 108, indicating that the allowed s-NSSAI and/or the corresponding network slice 116 has satisfied an authentication process or security criteria stored/accessed at the AUSF 114.

At step 414, the system 100 may send a registration acceptance message associated with the s-NSSAI value to the RAN node 104. For instance, the AMF 108 may generate and/or send the registration acceptance message and/or other messages containing an indication that the UE 102 has been registered with the one or more network slices 116 (e.g., the first network slice 116(A)). In some examples, the RAN node 104 may receive the registration message, and/or may extract information from the registration message (e.g., related to the one or more network slices 116)

FIG. 5 depicts an example method 500 that may be performed by any of the systems discussed herein, although system 200 is discussed by way of example merely for convenience. The method 500 may include techniques performed by the system 200 for establishing a PDU session for the UE 102 with the one or more network slices 116. In some instances, the steps of method 500 may be performed by the system 200 with one or more AMF messages 124 generated and/or sent by the AMF 108.

At step 502, the system 200 may receive a PDU session request associated with the UE 102. For instance, the RAN node 104 may receive the PDU session request, which may be generated by or sent from the UE 102, and the AMF 108 may receive the PDU session, which may be sent from the RAN node 104. The PDU session request may include the UE identifier, which the RAN node 104 or the AMF 108 may determine is associated with the s-NSSAI value. The s-NSSAI value may be stored at the RAN node 104. In some instances, the PDU session request may include the s-NSSAI value or may provide information to the RAN node 104 so that the RAN node 104 may determine that the s-NSSAI value is associated with the UE 102 and the PDU session request.

At step 504, the system 200 may send a NF discovery request including the s-NSSAI value to the NRF 202. For instance, the AMF 108 may generate and/or send a message including the NF discovery request (e.g., as one of the AMF messages 124) to the UDM 112. The NF discovery request may include the request for the PDU session (e.g., a request for an SMF identifier), and any other information needed by the NRF 202 to determine a particular SMF corresponding to the SMF identifier and to respond to the NF discovery request.

At step 506 the system 200 may receive an NF discovery response including the SMF identifier. For instance, the NRF 202 may generate and/or send the NF discovery response to the AMF 108. The SMF identifier may correspond to the particular SMF 118 of the first network slice 116(A) and may indicate that the particular SMF 118 is available/configured to establish the PDU session.

At step 508, the system 200 may send a PDU session establishment request to the particular SMF 118 which may be associated with SMF identifier. For instance, the AMF 108 may send the PDU session establishment request to the particular SMF 118 of the first network slice 116(A) and/or other SMFs of other network slices 116. The particular SMF 118 may perform an establishment procedure with the particular UPF 120 of the first network slice 116(A) in response to the system sending the PDU session establishment request.

At step 510, the system 200 may receive a PDU session establishment accept message associated with the s-NSSAI value. For instance, the AMF 108 may receive the PDU session establishment accept message, which may be generated and/or sent from the particular SMF 118. For instance, the system 200 may receive the PDU session establishment accept message at least partly in response to the particular SMF 118 completing the establishment procedure with the particular UPF 120.

At step 512, the system 200 may send a session request including the s-NSSAI value to the RAN node 104. For instance, the AMF 108 may generate and/or send the session request at least partly in response to receiving the PDU session establishment request. The session request may indicate to the RAN node 104 that the particular SMF 118 has completed the establishment procedure and the particular UPF 120 is available to receive a message from the UE 102 via the RAN node 104.

At step 514, the system may receive a session request ACK message associated with the s-NSSAI value from the RAN node 104. For instance, the RAN node may generate and/or send the session request ACK message to the AMF 108 at least partly in response to receiving the session request and/or at least partly in response to performing an Access Network (AN) resource setup procedure with the UE 102 in order to establish the PDU session with the first network slice 116(A). Operations of the RAN node 104 for establishing the PDU session are discussed in greater detail below regarding FIG. 6.

FIG. 6 depicts an example method 600 that may be performed by any of the systems discussed herein, although system 200 is discussed by way of example merely for convenience. The method 600 may include techniques performed by the system 200 for establishing the PDU session for the UE 102 with the one or more network slices 116. In some instances, the steps of method 600 may be performed by the system 200 with the one or more RAN node messages 106 generate and/or sent by the RAN node 104.

At step 602, the system 200 may receive the PDU session request associated with the UE 102 via the RRC connection. For instance, the RAN node 104 may receive the PDU session request via a wireless transmission from the UE 102 registered to the RAN node 104 and the first network slice 116(A). The PDU session request may include the UE identifier, which the RAN node 104 may determine is associated with the s-NSSAI value. In some instances, the PDU session request may include the s-NSSAI value or may provide information to the RAN node so that the RAN node 104 may determine the s-NSSAI value associated with the UE 102 and the PDU session request.

At step 604, the system 200 may send the PDU session request to the AMF 108. For instance, the RAN node 104 may relay a first PDU session request to the AMF 108 and/or the RAN node 104 may generate a new, second PDU session request or another message to send to the AMF 108 based at least partly on the first PDU session request. In some instances, the RAN node 104 may extract, store, and/or analyze data contained within a header or a body of the first PDU session request received at the RAN node 104.

At step 606, the system 200 may receive the session request including the s-NSSAI value associated with the UE 102. For instance, the AMF 108 may send the session request to the RAN node indicating that the UPF 120 of the first network slice 116 has successfully configured to provide the PDU session to the UE 102.

At step 608, the system 200 may perform the AN resource setup process with the UE 102. For instance, the RAN node 104 and/or the UE 102 may send or otherwise establish one or more Data Radio Bearers (DRB)s containing information such as the s-NSSAI value and/or details about the PDU session, the first network slice 116(A), and/or the particular UPF 120. The RAN node 104 may prepare radio resource and setup the DBRs between the UE 102 and the RAN node 104. In some instances, any applications or services from an Application server may be directed to the RAN node 104 based on a DBR setup process. As such, the RAN node may know what type of services are communicating with the UE 102 and how to manage these services in radio resource management. For example, the RAN node 104 may determine how to treat the UE 102 with service-based requirements and/or provide different radio resources to meet an SLA associated with the UE 102.

At step 610, the system 200 may receive the PDU session establishment accept message from the UE 102. For instance, the RAN node 104 may receive the PDU session establishment message accept message indicating that the UE 102 has completed the AN resource setup procedure, and the UE 102 is ready to establish the PDU session with the first network slice 116(A).

At step 612, the system 200 may establish a data uplink between the UE 102 and the particular UPF 120 of the first network slice 116(A), which may be associated with the s-NSSAI value. The data uplink may be established based at least in part on the DNN 122. As such, the RAN node 104 may complete the PDU session establishment procedure for the UE 102.

FIG. 7 depicts an example method 700 that may be performed by any of the systems discussed herein, although system 300 is discussed by way of example merely for convenience. The method 700 may include techniques performed by the system 300 for providing a service to the UE 102 with the one or more network slices 116. In some instances, the steps of method 700 may be performed with one or more AMF messages 124 generated and/or sent by the AMF 108.

At step 702, the system 300 may receive, from the RAN node 104, a service request, which may include a UE identifier (e.g., a 5G Temporary Mobile Subscriber Identity (TMSI) value) and/or location data. The location data may indicate an area in which the UE 102 is located (e.g., according to roaming specifications). The RAN node 104 may determine that the service request may be fulfilled by the one or more network slices 116, for instance, based on the s-NSSAI value stored at the RAN node 104 and/or an association of the s-NSSAI value to the UE identifier. Accordingly, the RAN node 104 may send the service request to the AMF 108.

At step 704, the system 300 may send an authentication request to the AUSF 114. For instance, the AMF 108 may send the authentication request to the AUSF 114 at least partly in response to receiving the service request. The authentication request may be part of an authentication process between the AUSF 114 and the AMF 108 to determine whether a service associated with the service request satisfies one or more authentication or security requirements.

At step 706, the system 300 may send a PDU context update request to the particular SMF 118 of the first network slice 116(A) associated with the s-NNSAI. For instance, the AMF 108 may send the PDU context update request at least partly in response to determining that the s-NSSAI is stored at the RAN node 104. The PDU context update request may include service information for the particular SMF 118 such that the particular SMF 118 may, based at least in part on the service information, determine NFs of the second network slice 116(B) and/or another of the one or more network slices 116(N) that may be able to provide the service associated with the service request. For instance, as a result of the AMF 108 sending the PDU context update request, the particular SMF 118 may send a session establishment request to the second UPF 120(B) of the second network slice 116(B) as part of a session establishment process for fulfilling the service request. The second UPF 120(B) may send a session establishment response to the particular SMF 118 indicating that a data flow is established between the second UPF 120(B) and the first UPF 120(A) of the first network slice 116(A).

At step 708, the system 300 may receive a PDU session context update response from the particular SMF 118 indicating that the second UPF 120(B) of the second network slice 116(B) has established the data flow with the first UPF 120 of the first network slice 116(A). Additionally, or alternatively, at step 708, the system 300 may receive a rejection associated with the PDU context update request and/or the s-NSSAI, for instance, based on determining that a particular service is not supported and/or determining that an overload has occurred at the core network.

At step 710, the system 300 may send a user plane request to the RAN node 104 to establish an upload link between the UE 102 (e.g., via the RAN node 104) and the second UPF 120(B) of the second network slice 116(B). For instance, the user plane request may indicate that the session establishment procedure between the first network slice 116(A) and the second network slice 116(B) has completed and, as such, the second UPF 120(B) is ready to provide the service to the UE 102.

FIG. 8 depicts an example method 800 that may be performed by any of the systems discussed herein, although system 100 is discussed by way of example merely for convenience. The method 800 may include techniques performed by the system 100 for providing a service to the UE 102 with the one or more network slices 116. In some instances, the steps of method 800 may be performed with the one or more RAN node messages 106 generated and/or sent by the RAN node 104.

At step 802, the system 300 may receive, from the UE 102, a service request including a PDU session list. For instance, the RAN node 104 may receive the service request, which may include the UE identifier and/or location data. The RAN node 104 may determine that the service request may be fulfilled by the one or more network slices 116, for instance, based on the s-NSSAI value stored at the RAN node 104 and/or an association of the s-NSSAI value to the UE identifier.

At step 804, the system 300 may determine that the UE 102 is associated with the first network slice 116(A) based on an s-NSSAI value stored at the RAN node 104. For instance, the RAN node 104 may store instructions to determine a UE 102 identifier from the service request and determine that the UE 102 identifier is associated with the s-NSSAI value and/or the one or more network slices 116(N). As such the RAN node 104 may determine what configuration of the one or more network slices 116(N) can provide the service to the UE 102 (e.g., based at least in part on data from the SLA).

At step 806, the system 300 may send, to the AMF 108, the service request including the 5G TMSI value and/or the location information. For instance, the RAN node 104 may send the service request based at least in part on determining that the second network slice 116(B) is capable of providing the service associated with the service request to the UE 102.

At step 808, the system 300 may receive the user plane request indicating the second UPF 120(B) of the second network slice 116(B) is available and/or capable of providing the service to the UE 102. The AMF 108 may send the user plane request to the RAN node 104. The user plane request may indicate that the session establishment procedure between the first network slice 116(A) and the second network slice 116(B) has completed and, as such, the second UPF 120(B) is ready to provide the service to the UE 102.

At step 810, the system 300 may send, to the UE 102, an RRC reconfiguration DRB. For instance, the RAN node 104 may generate and/or send one or more DRBs to the UE 102, included in the one or more DRBs, may be instructions to setup a user plane data uplink with the second UPF 120(B) of the second network slice 116(B).

At step 812, the system 300 may establish the data uplink between the UE 102 and the second UPF 120(B) of the second network slice 116(B) based at least partly on the s-NSSAI value. For instance, according to information exchanged between the UE 102 and the RAN node 104 via the one or more DRBs, the second UPF 120(B) of the second network slice 116(B) may provide the service to the UE 102 via the data uplink. The data uplink may be based at least in part on the UPF 120 communicating with the DNN 122 and/or the UPF 120 providing an indication of the DNN 122 to other NFs. The service may comprise one or more of and/or may support a text service, a voice service, or a wireless data service (e.g., which may be provided by the core network).

Although FIGS. 4-8 illustrate example operations, the described operations in these figures (and all other methods and operations disclosed herein) may be performed in other orders different than those illustrated in FIGS. 4-8 and multiple steps may be performed simultaneously or in parallel. Furthermore, in some examples, one or more operations illustrated in FIGS. 4-8 may be omitted, repeated, and/or combined with other operations illustrated in FIGS. 4-8, or any other operations and components discussed in this disclosure. In some instances, any of the steps performed in FIGS. 4-8 may be performed at least partly in response to any steps performed in FIGS. 4-8. Any of steps FIGS. 4-8 may be performed based on determinations at the RAN node 104, such as a spectrum allocation exceeding a threshold and/or determining a location associated with the UE. Any of the functions performed by one or more NFs of the core network including the AMF may, in some examples, be performed by the RAN node 104 (e.g., instructions executed by processors at the RAN node 104 and/or stored at computer-readable storage media at the RAN node 104). In some instances, the operations illustrated in FIG. 4-8 may be performed in multiple iterations for instance, to perform RAN-layer network slicing via hundreds or even thousands of RAN nodes 104, NFs, AMFs 108, and/or network slices 116(N) around the globe.

CONCLUSION

Although this disclosure uses language specific to structural features and/or methodological acts, it is to be understood that the scope of the disclosure is not necessarily limited to the specific features or acts described. Rather, the specific features and acts are disclosed as illustrative forms of implementation.

What is claimed is:

1. A method performed by an Access and Mobility Management Function (AMF), the method comprising:
   receiving, from a User Equipment (UE) and via a Radio Resource Control (RRC) connection, a slice registration request including a request for a requested Network Slice Selection Assistance Information (NSSAI) value;
   receiving, from a Policy Control Function (PCF), a Service Level Agreement (SLA) associated with the UE;
   sending, to a Network Slice Selection Function (NSSF), a slice selection request;
   receiving, from the NSSF, an allowed NSSAI value;

storing an association of the allowed NSSAI value to a network slice; and
sending, to the UE and via the RRC connection, the allowed NSSAI value,
wherein at least one of the slice selection request or the allowed NSSAI value is based at least in part on the SLA.

2. The method of claim 1, wherein storing the association of the allowed NSSAI value to the network slice comprises sending the allowed NSSAI value to be stored at a gNodeB (gNB).

3. The method of claim 2, wherein the network slice comprises one or more of a particular session management function (SMF) configuration, a particular user plane function (UPF) configuration, or a particular spectrum allocation.

4. The method of claim 3, further comprising:
receiving, from the UE, a protocol data unit (PDU) session request that includes the allowed NSSAI value; and
establishing, based at least in part on the allowed NSSAI value, a PDU session with the particular SMF configuration and the particular UPF configuration.

5. The method of claim 1, wherein the allowed NSSAI value comprises a same value as the requested NSSAI value.

6. The method of claim 1, wherein the allowed NSSAI value comprises a different value than the requested NSSAI value.

7. The method of claim 1, wherein the slice registration request is based at least in part on one or more of a Quality of Service (QoS) indicator, a location of the UE, a Public Land Mobile Network (PLMN) identifier, or a Data Network Name (DNN).

8. A Radio Access Network (RAN) node comprising:
one or more processors; and
one or more non-transitory computer-readable storage media storing instructions that, when executed by the one or more processors, cause the RAN node to:
receive, from a User Equipment (UE) and via a Radio Resource Control (RRC) connection, a registration request;
send, to a Network Slice Selection Function (NSSF), via an Access and Mobility Management Function (AMF), and based at least in part on the registration request, a slice selection request;
receive, from the NSSF, a Network Slice Selection Assistance Information (NSSAI) value;
store an association of the NSSAI value to a network slice;
send, to the UE and via the RRC connection, the NSSAI value; and
establish a bearer with the UE, wherein the bearer is based at least in part on the NSSAI value.

9. The RAN node of claim 8, wherein the network slice is associated with one or more of a particular session management function (SMF) configuration, a particular user plane function (UPF) configuration, or a particular spectrum allocation, and the instructions, when executed by the one or more processors, further cause the RAN node to:
receive, from the UE, a protocol data unit (PDU) session request that includes the NSSAI value; and
establish, based at least in part on receiving the NSSAI value from the UE and the association stored at a gNB, a PDU session with the particular SMF configuration and the particular UPF configuration.

10. The RAN node of claim 8, wherein the registration request is received at an Access and Mobility Management Function (AMF) of a 5G network.

11. The RAN node of claim 8, wherein the registration request is based at least in part on one or more of a Quality of Service (QoS) indicator, a location of the UE, a Public Land Mobile Network (PLMN) identifier, or a Data Network Name (DNN).

12. The RAN node of claim 8, wherein the instructions, when executed by the one or more processors, further cause the RAN node to:
receive, from a Policy Control Function (PCF), a Service Level Agreement (SLA) associated with the UE, and wherein at least one of the slice selection request or the NSSAI value is based at least in part on the SLA.

13. A system comprising:
one or more network slices; and
a Radio Access Network (RAN) node including non-transitory computer-readable media storing instructions that, when executed, cause the RAN node to:
receive, via a Radio Resource Control (RRC) connection, a registration request including a request for a Network Slice Selection Assistance Information (NSSAI) value;
receive, from a Policy Control Function (PCF), a Service Level Agreement (SLA) associated with a User Equipment (UE);
send to a Network Slice Selection Function (NSSF), a slice selection request;
receive, from the NSSF and via an Access and Mobility Management Function (AMF), the NSSAI value;
store an association of the NSSAI value to a network slice of the one or more network slices; and
send, via the RRC connection, the NSSAI value for storage at the UE,
wherein at least one of the slice selection request or the NSSAI value is based at least in part on the SLA.

14. The system of claim 13, wherein:
the RAN node comprises a base station of a 5G network; and
the network slice comprises one or more of a particular session management function (SMF) configuration, a particular user plane function (UPF) configuration, or a particular spectrum allocation.

15. The system of claim 14, wherein the instructions, when executed, further cause the RAN node to:
receive, from the UE, a protocol data unit (PDU) session request that includes the NSSAI value; and
establish, based at least in part on receiving the NSSAI value from the UE and the association stored at a gNB, a PDU session with the particular SMF configuration and the particular UPF configuration.

16. The system of claim 14, wherein the registration request is received at the AMF of the 5G network.

17. The system of claim 13, wherein the registration request is based on one or more of a Quality of Service (QoS) indicator, a location of the UE, a Public Land Mobile Network (PLMN) identifier, or a Data Network Name (DNN).

* * * * *